United States Patent
Eshwar et al.

(10) Patent No.: US 9,471,403 B1
(45) Date of Patent: *Oct. 18, 2016

(54) GRANULAR EVENT MANAGEMENT FOR SERVICE PLATFORMS

(71) Applicant: INTERNATIONAL BUSINESS MACHINES CORPORATION, Armonk, NY (US)

(72) Inventors: Bhavani K. Eshwar, Bangalore (IN); Soma Shekar Naganna, Bangalore (IN); Umasuthan Ramakrishnan, Bangalore (IN); Joseph Xaviour, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/143,846

(22) Filed: May 2, 2016

Related U.S. Application Data (63) Continuation of application No. 14/666,915, filed on Mar. 24, 2015.

(51) Int. Cl.
  *G06F 13/00* (2006.01)
  *G06F 9/54* (2006.01)
  *G06F 17/30* (2006.01)

(52) U.S. Cl.
  CPC .......... *G06F 9/542* (2013.01); *G06F 17/30312* (2013.01)

(58) Field of Classification Search
  CPC .............................. G06F 9/465; G06F 9/542
  USPC ................................................. 719/316, 318
  See application file for complete search history.

(56) References Cited

U.S. PATENT DOCUMENTS 6,298,353 B1 10/2001 Apte
7,207,002 B2 4/2007 Mireku
8,375,110 B2 2/2013 Jung et al.
(Continued)

FOREIGN PATENT DOCUMENTS

JP   2014006641 A  1/2014
KR   1020080024751 A  3/2008

OTHER PUBLICATIONS

Charters et al., "Best practices for developing and working with OSGi applications", IBM®, developerWorks®, Jul. 14, 2010, pp. 1-22, provided in search report dated Feb. 12, 2012, <http://www.ibm.com/developerworks/websphere/techjournal/1007_charters/1007_charters-pdf.pdf>.

(Continued)

*Primary Examiner* — Andy Ho
(74) *Attorney, Agent, or Firm* — Erik K. Johnson (57) ABSTRACT

Granular event management for service platforms. First bundle information relating to the content of a bundle is received at a first time, wherein the bundle relates to one or more resources in an application of a distributed computing environment. The bundle is monitored for a bundle event, wherein the bundle event is generated from a change in a lifecycle state of the bundle. Whether the bundle event has occurred is determined. Responsive to determining that the bundle event has occurred, second bundle information relating to the content of the bundle is received at a second time. Responsive to receiving the second bundle information, a granular event associated with the bundle event is identified, wherein the granular event relates to a difference between the first bundle information and the second bundle information.

7 Claims, 5 Drawing Sheets

(56) References Cited

U.S. PATENT DOCUMENTS

| | | |
|---|---|---|
| 2006/0252406 A1 | 11/2006 | Fey et al. |
| 2006/0293033 A1 | 12/2006 | Ma et al. |
| 2007/0083925 A1 | 4/2007 | Hargrave et al. |
| 2008/0216093 A1 | 9/2008 | MacLellan et al. |
| 2008/0256225 A1 | 10/2008 | Suh et al. |
| 2008/0301124 A1 | 12/2008 | Alves et al. |
| 2008/0301135 A1 | 12/2008 | Alves et al. |
| 2009/0276755 A1 | 11/2009 | Beltowski et al. |
| 2009/0282400 A1 | 11/2009 | Jung et al. |
| 2011/0107352 A1 | 5/2011 | Wells et al. |
| 2011/0145382 A1 | 6/2011 | Lee et al. |
| 2012/0173715 A1 | 7/2012 | Selitser et al. |
| 2012/0233593 A1 | 9/2012 | Sahoo et al. |
| 2015/0220308 A1 | 8/2015 | Condon et al. |

OTHER PUBLICATIONS

Rellermeyer et al., "R-OSGi: Distributed Applications through Software Modularization", Department of Computer Science, ETH Zurich, 8092 Zurich, Switzerland, pp. 1-20, provided in search report dated Feb. 12, 2012, <http://citeseerx.ist.psu.edu/viewdoc/download?doi=10.1.1.112.436&rep=rep1&type=pdf>.

Pending U.S. Appl. No. 14/666,915, filed Mar. 24, 2015, Entitled: "Granular Event Management for Service Platforms", pp. 1-29.

IBM, List of IBM Patents or Patent Applications Treated as Related, Appendix P, dated May 2, 2016, 2 pages.

GRANULAR EVENT MANAGEMENT FOR SERVICE PLATFORMS

BACKGROUND OF THE INVENTION

The present invention relates generally to the field of distributed computing environments, and more particularly to a method for managing granular events by processing bundle events.

Distributed computing environments implement service platforms for managing lifecycles of software components of network devices. An Open Service Gateway initiative (OSGi) architecture is a known service platform that uses bundles to dynamically install and manage new services on network devices, as well as executing the services provided by those bundles. Bundles are basic units which run within an OSGI container responsible for performing a specific task, including at least one OSGi service, and undergo one or more bundle events.

Typically, event management for OSGi architectures and other service platforms involves a plugin descriptor to detect an occurrence of an event at the bundle level. Furthermore, detection of bundle events helps improve lifecycle management of objects in distributed computing environments.

SUMMARY

Embodiments of the present invention provide systems, methods, and computer program products for managing granular events by processing bundle events. First bundle information relating to the content of a bundle is received at a first time, wherein the bundle relates to one or more resources in an application of a distributed computing environment. The bundle is monitored for a bundle event, wherein the bundle event is generated from a change in a lifecycle state of the bundle. Whether the bundle event has occurred is determined. Responsive to determining that the bundle event has occurred, second bundle information relating to the content of the bundle is received at a second time. Responsive to receiving the second bundle information, a granular event associated with the bundle event is identified, wherein the granular event relates to a difference between the first bundle information and the second bundle information.

DETAILED DESCRIPTION

Embodiments of the present invention provide systems, methods, and computer program products for managing granular events in open service gateway initiative (OSGi) environments. Embodiments of the present invention can detect bundle events and process the detected bundle events into granular events. Furthermore, embodiments of the present invention may be used to provide subscribers with generated notifications describing one or more granular event occurrences.

Figure 1:
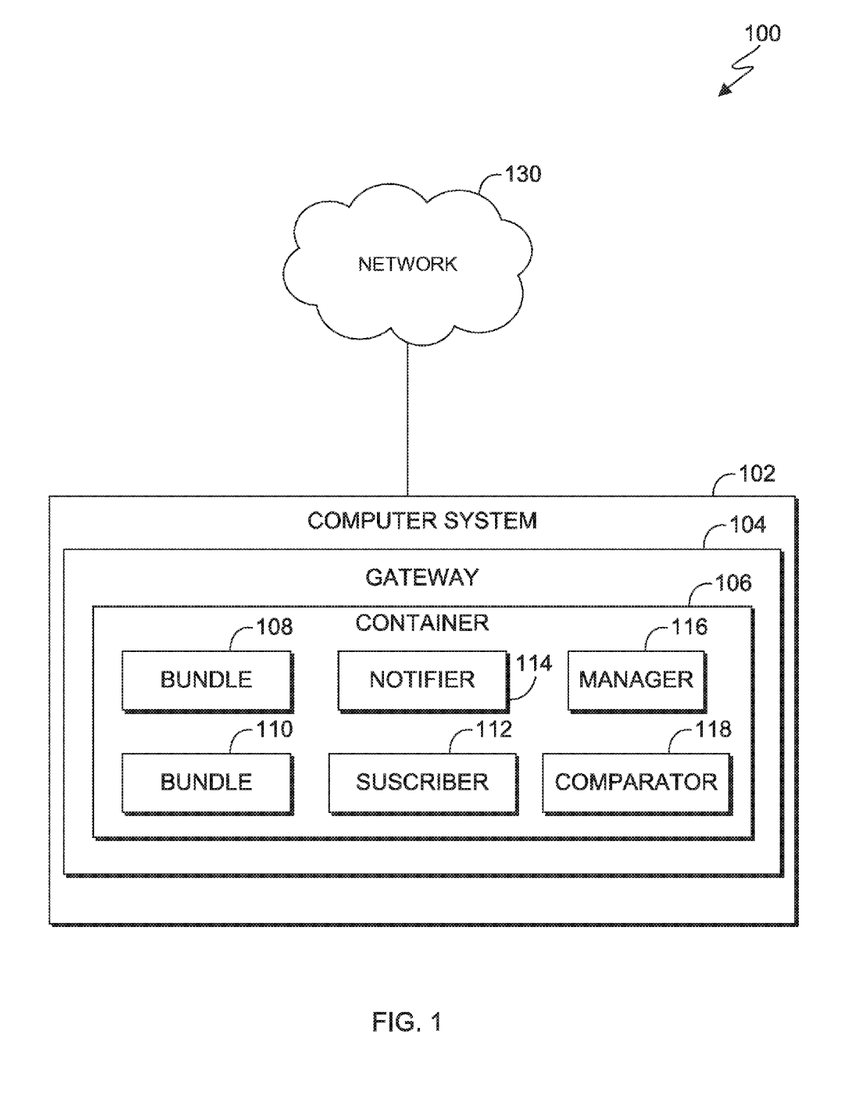
FIG. 1 is a block diagram of a service platform environment, in accordance with an embodiment of the present invention.

FIG. 1 is a block diagram of service platform environment 100, in accordance with an embodiment of the present invention. Service platform environment 100 includes computer system 102 and network 130. Computer system 102 can be a desktop computer, laptop computer, specialized computer server, or any other computer systems known in the art. In certain embodiments, computer system 102 represents computer systems utilizing clustered computers and components to act as a single pool of seamless resources when accessed through network 130. For example, such embodiments may be used in data center, cloud computing, storage area network (SAN), and network attached storage (NAS) applications. In certain embodiments, computer system 102 represents virtual machines. In general, computer system 102 is representative of any electronic device, or combination of electronic devices, capable of executing machine-readable program instructions, as discussed in greater detail with regard to FIG. 5.

Gateway 104 is a service platform framework (e.g., Java framework) for developing and deploying modular software programs and libraries. (Note: the term "Java" may be subject to trademark rights in various jurisdictions throughout the world and is used here only in reference to the products or services properly denominated by the marks to the extent that such trademark rights may exist.) In one embodiment, gateway 104 comprises container 106, as well as additional services and components that facilitate functionality of gateway 104. For example, gateway 104 may include registries, application programming interfaces (API's), and other services (e.g., system services, protocol services, etc.). Furthermore, gateway 104 may be integrated in runtime environments (e.g., Java Runtime Environment), operating systems, and appropriate other components as described in FIG. 5.

Container 106 includes bundle 108, bundle 110, subscriber 112, notifier 114, manager 116, and comparator 118. In other embodiments, container 106 may include additional bundles other than bundle 108 and bundle 110. In one embodiment, container 106 includes components that are modular and help manage one or more services. For example, an application utilizing container 106 may involve multiple services that are distributed in one or more components of container 106. Furthermore, the one or more components in container 106 help more easily manage cross-dependencies between bundle 108 and bundle 110.

Bundle 108 and bundle 110 comprise artifacts (e.g., Java classes, bundle content, etc.), metadata (e.g., bundle descriptor, manifest file, etc.), as well as additional services that give the artifacts sophisticated behaviors. In one embodiment, bundle 108 and/or bundle 110 undergo a bundle event. The bundle event may be based, at least in part, on bundle information relating to bundle content of bundle 108 and/or bundle 110 at a first time, and bundle information relating to bundle content of bundle 108 and/or bundle 110 at a second time. Furthermore, the bundle information relating to bundle content of bundle 108 and/or 110 may be metadata (e.g., bundle descriptor, manifest file, etc.), as previously discussed. In another embodiment, a bundle event may be based, at least in part, on a change in lifecycle state (e.g., INSTALLED, RESOLVED, STARTING, ACTIVE, STOP- PING, UNINSTALLED, etc.). For example, bundle 108 is "INSTALLED" at a first time, and is subsequently "UNINSTALLED" at a second time. In this instance, bundle content (e.g., Java classes, etc.) are modified with respect to the changed lifecycle state. Furthermore, the modifications made to the bundle content can be described by identified granular events, as described in greater detail herein. In one embodiment, the identified granular events are one or more changes in bundle content as a result of a bundle event (e.g., class definition changes, object changes, etc.). The various lifecycle states of bundle 108 and bundle 110 can be detected by manager 116. As previously discussed, a greater number of bundles can be located in container 106 or in another container of gateway 104, and there may be a number of dependencies between the bundles. For example, in certain embodiments, bundle 108 may have one or more dependencies on bundle 110. In yet another embodiment, bundle 110 or bundle 108 may be located outside of container 106 (e.g., in a distributed caching solution). Furthermore, bundle 110 and/or bundle 108 may be bundles that contain one or more dynamically loadable Java class files.

Subscriber 112 includes one or more components or parties that subscribe to notifications generated by notifier 114. In one embodiment, subscriber 112 is an application and/or a bundle (e.g., bundle 108, bundle 110, etc.) configured to receive notifications that describe bundle events. In another embodiment, subscriber 112 is disposed within container 106 and helps manage services executed within container 106. In yet another embodiment, subscriber 112 is implemented by another component of service platform environment 100 (not depicted) to help manage services executed across service platform environment 100. In general, subscriber 112 is used by service platform environment 100 and components therein to receive notifications that describe bundle events, and leverage the received notifications to help manage services and changes in lifecycle states of components within service platform environment 100. Furthermore, it should be understood that a greater or lesser number of subscribers 112 may be implemented by service platform environment 100 to facilitate management of executable services and application of service platform environment 100.

Notifier 114 generates event messages (e.g., bundle events, granular event occurrences, etc.), and uses the generated event messages to notify one or more subscribers 112. In one embodiment, notifier 114 uses information retrieved from a sub-component (e.g., event log) of manager 116.

Manager 116 monitors bundle 108 and bundle 110 for bundle events (e.g., a change in a bundle lifecycle state). Furthermore, manager 116 interacts with notifier 114 and comparator 118 to further process bundle events and generate notifications based on granular event occurrences. In one embodiment, manager 116 identifies granular event occurrences in bundle 108 and bundle 110 by using bundle information relating to bundle content of bundles 108 and 110 at a first time, and bundle information relating to content of bundles 108 and 110 at a second time (e.g., metadata that describes bundle content).

Comparator 118 processes bundle events for bundle 108 and bundle 110 that were detected by manager 116 to generate granular events. In one embodiment, comparator 118 compares bundle information relating to bundle content of bundle 108 and bundle 110 (e.g., metadata bundle descriptor, content metadata, and annotations in the Java class) by using bundle information relating to bundle content of bundles 108 and 110 at a first time, and bundle information relating to content of bundles 108 and 110 at a second time. For example, if bundle 108 underwent a change in lifecycle state (e.g., UNRESOLVED to RESOLVED), then comparator 118 compares bundle information relating to bundle content from an UNRESOLVED lifecycle state of bundle 108 with bundle information relating to bundle content from a RESOLVED lifecycle state of bundle 108.

Figure 2:
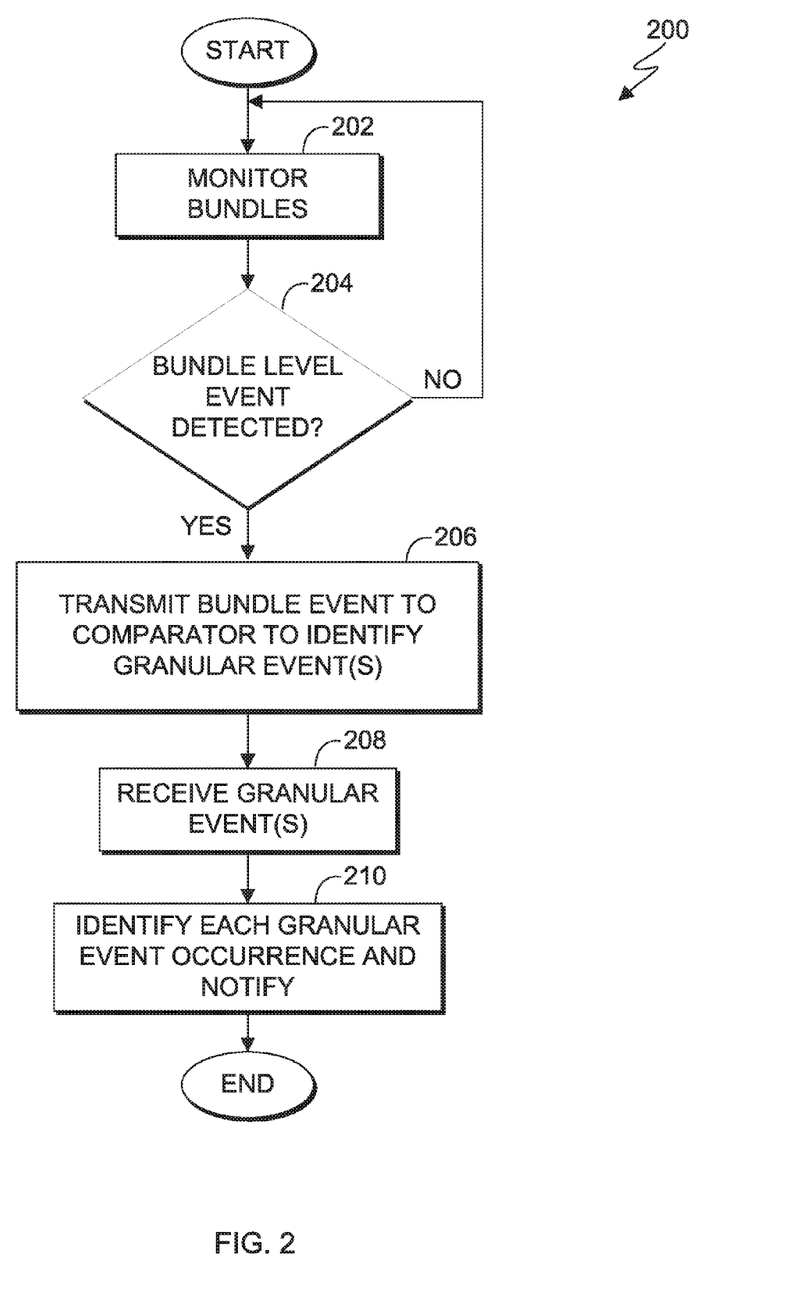
FIG. 2 is a flowchart illustrating operational steps for identifying granular events, in accordance with an embodiment of the present invention.

FIG. 2 is flowchart 200 illustrating operational steps for identifying granular events, in accordance with an embodiment of the present invention. As previously discussed, bundle 108 and bundle 110 undergo various bundle events, such as lifecycle state changes. In one embodiment, lifecycle state changes of bundles 108 and 110 may be described by bundle information relating to bundle content of bundles 108 and 110. Typically, a bundle event manager detects bundle events (e.g., changes in lifecycle states) of bundles 108 and 110. In one embodiment, if a bundle event is detected in bundles 108 and/or 110, then computer system 102 uses bundle information relating to bundle content of bundles 108 and/or 110 to generate and identify one or more granular events. In one embodiment, the one or more granular events are based, at least in part, on discrepancies between bundle information relating the bundle content of bundles 108 and/or 110 at a first time, and bundle information relating the bundle content of bundles 108 and/or 110 at a second time. For example, metadata of bundles 108 and/or 110 prior to the bundle event and metadata of bundles 108 and/or 110 subsequent to the bundle event may be compared to generate and identify the one or more granular events. Using the one or more granular events helps improve lifecycle management of objects in distributed computing environments.

In step 202, manager 116 monitors bundle 108 and bundle 110 for bundle events. In one embodiment, manager 116 uses a bundle descriptor for bundle 108 and a bundle descriptor for bundle 110 to monitor for a bundle event (e.g., change in lifecycle state) in bundle 108 and/or bundle 110. As previously discussed, a bundle event is based, at least in part, on one or more changes in objects and/or classes of bundles 108 and/or 110 (i.e., bundle content). In one embodiment, the one or more changes in objects and/or classes of bundles 108 and/or 110 may be a result from a change in lifecycle state of bundles 108 and/or 110. Furthermore, the one or more changes (i.e., granular events) can be identified by processing discrepancies between bundle information relating the bundle content of bundles 108 and/or 110 at a first time and bundle information relating the bundle content of bundles 108 and/or 110 at a second time, as described in greater detail herein. For example, bundle 110 may undergo a bundle event, wherein the bundle event involves a change in lifecycle state from "STARTING" to "STOPPING." In this instance, one or more changes in objects and/or classes of bundle 110 may occur as a result of the change in lifecycle state for bundle 110. Accordingly, subsequent processing of the bundle event may help generate and identify granular events that describe the one or more changes in objects and/or classes (i.e., bundle content) of bundle 110.

In step 204, manager 116 determines whether a bundle event was detected. In one embodiment, the bundle descriptor for bundle 108 and the bundle descriptor for bundle 110 contains information to determine whether one or more bundle events occurred. In other embodiments, manager 116 may determine bundle event occurrences for bundles 108 and/or 110 using any method known in the art.

If, in step 204, manager 116 determines that a bundle event was detected, then in step 206, manager 116 transmits the detected bundle event to comparator 118 to identify one or more granular events. For example, if bundle 110 undergoes a bundle event (e.g., from UNINSTALL to INSTALL lifecycle state), then comparator 118 compares bundle information relating the bundle content of bundle 110 at a first time, and bundle information relating the bundle content of bundle 110 at a second time. Stated differently, discrepancies of metadata between the UNINSTALL lifecycle state of bundle 110 and the INSTALL lifecycle state of bundle 110 help create one or more granular events. It should be understood that, the one or more identified granular events are identified in a different manner from which the bundle event is detected. For example, the information used to identify granular events in step 206 may be unavailable to manager 116 or comparator 118 at the time that manager 116 is monitoring bundles for bundle events (step 202). In certain embodiments, the metadata used by manager 116 to detect bundle events includes only lifecycle state information, while the information used to identify granular events by comparator 118 includes additional, more granular, information.

If, in step 204, manager 116 determines that a bundle event was not detected, then manager 116 continues to monitor bundle 108 and bundle 110 as described in step 202.

In step 208, manager 116 receives the created one more granular events from comparator 118. In one embodiment, manager 116 receives information describing the one or more granular events. For example, the information may describe mapping of the bundle event or higher level event to the granular events, attributes of the bundle descriptor, introspection depth for bundle content, computed values of bundle content, annotations of interest, event annotation, etc.

In step 210, manager 116 identifies the one or more created granular events and transmits the identified granular events to notifier 114. In one embodiment, manager 116 uses the information received from comparator 118 in step 208 to identify the one or more created granular events. Furthermore, manager 116 also identifies cross-dependencies of objects in container 106 and/or gateway 104 that are associated with the granular event. For example, as previously discussed, bundle 110 underwent a lifecycle state change (e.g., a bundle event) from ACTIVE to INACTIVE. In this instance, one or more granular events were created and subsequently identified. Furthermore, manager 116 analyzes the one or more identified granular events to determine if one or more portions of bundle content in bundle 108 have dependencies outside of bundle 108. If one or more portions of bundle content are identified in bundle 108 that have external dependencies (e.g., a dependent class and/or object in bundle 110), then manager 116 ensures that notifications reflect granular event occurrences in both bundle 108 and bundle 110. Examples of information that manager 116 uses to analyze the one or more identified granular events are: "EBEMSupported," which can describe whether an extended bundle event manager is supported or not; "EBEMSupportedPackages," which describes a group of classes and/or objects (e.g., packages) to be introspected by the extended bundle event manager; "EBEMSupportedClasses," which includes a list of specific classes that should be introspected by the extended bundle event manager; "SupportedAnnotations," which include a list of annotations that should be considered by the extended bundle event manager to detect the changes that have been introduced; "AuditLog," which logs the changes that has been detected; and "rollbackSupported," which helps to rollback in the event of failures, such as metadata updates, etc.

Figure 3:
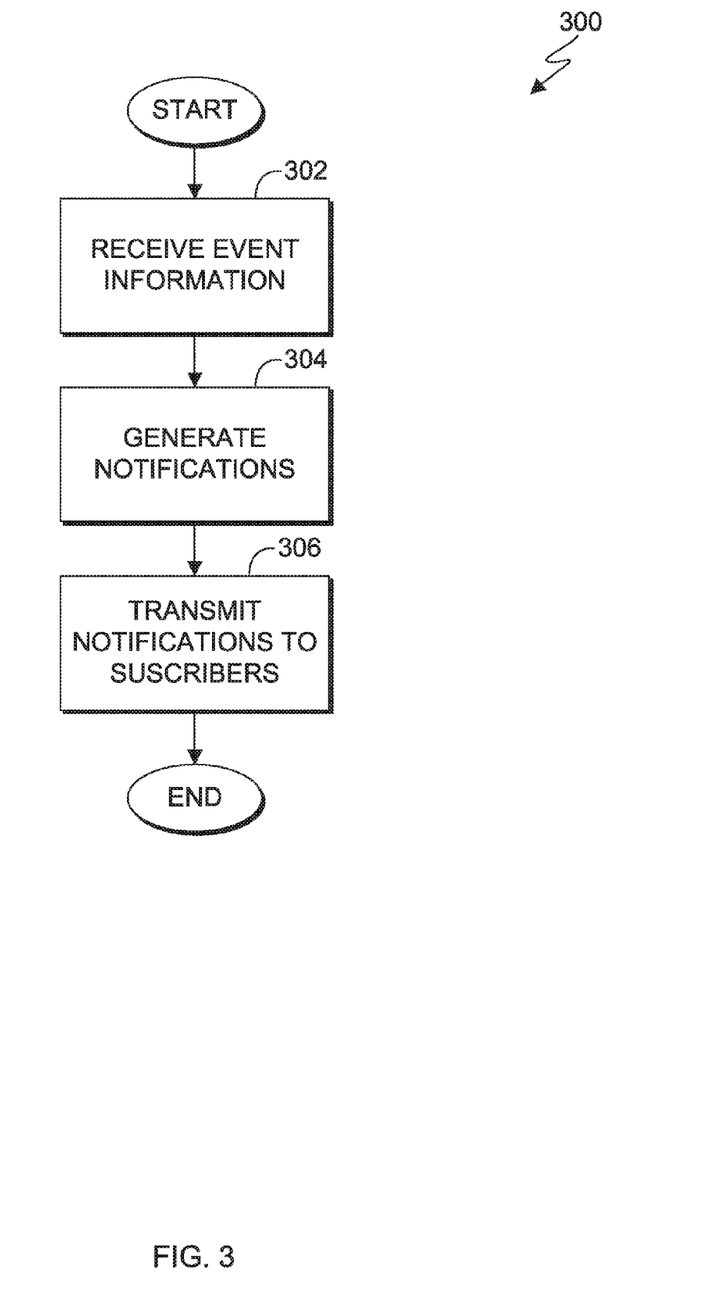
FIG. 3 is a flowchart illustrating operational steps for notifying subscribers of detected granular events, in accordance with an embodiment of the present invention.

FIG. 3 is a flowchart 300 illustrating operational steps for notifying subscribers 112 of detected granular events, in accordance with an embodiment of the present invention. In one embodiment, subscribers 112 retrieve notifications for bundle event occurrences and detected granular events. As previously described, subscribers 112 are implemented by service platform environment 100 to facilitate management of executable services and application of service platform environment 100.

In step 302, notifier 114 receives granular event information from manager 116. In one embodiment, this information may be retrieved from a sub-component (i.e., event log) of manager 116.

In step 304, notifier 114 uses the information received from manager 116 to generate a notification. In one embodiment, the notifications describe the granular event occurrence by including information, such as describing the one or more portions of bundle content that have changed (i.e., class changes, object redefinitions, etc.). An example of a notification can be seen in Code 1.

Code 1

```
<?xml version="1.0" encoding="UTF-8"?>
<xsd:schema         xmlns:xsd="http://www.w3.org/2001/
    XMLSchema">
  <xsd:element name="eventid" type="xsd:string" I>
  <xsd:element name="eventtype" type="xsd: string" I>
  <xsd:element name="originatorid" type="xsd:string" I>
  <xsd:element name="paramname" type="xsd: string" I>
  <xsd:element name="paramvalue" type="xsd: string" I>
  <xsd:element name="parameter" type="parameterType"
      I>
  <xsd:element              name="eemeventmessage"
      type="eemeventmessageType" I>
  <xsd:complexType name="parameterType">
    <xsd:sequence>
      <xsd:element ref="paramname" minOccurs="/"
          maxOccurs="/" I>
      <xsd:element ref="paramvalue" minOccurs="/"
          maxOccurs="/" I>
    </xsd:sequence>
  </xsd:complexType>
  <xsd:complexType name="eemeventmessageType">
    <xsd:sequence>
      <xsd:element ref="eventid" minOccurs="/" maxOccurs="/" I>
      <xsd:element ref="eventtype" minOccurs="/"
          maxOccurs="/" I>
      <xsd:element ref="originatorid" minOccurs="/"
          maxOccurs="/" I>
      <xsd:element ref="parameter" minOccurs="0"
          maxOccurs="unbounded" I>
    </xsd:sequence>
  </xsd:complexType>
</xsd: schema>
```

In step 306, notifier 114 transmits the generated notification to subscriber 112. In one embodiment, the generated notification includes parameters that can provide additional detail to subscriber 112. Furthermore, the type of granular event is defined in the metadata of the generated notification that is later used by subscriber 112 to take action.

Figure 4:
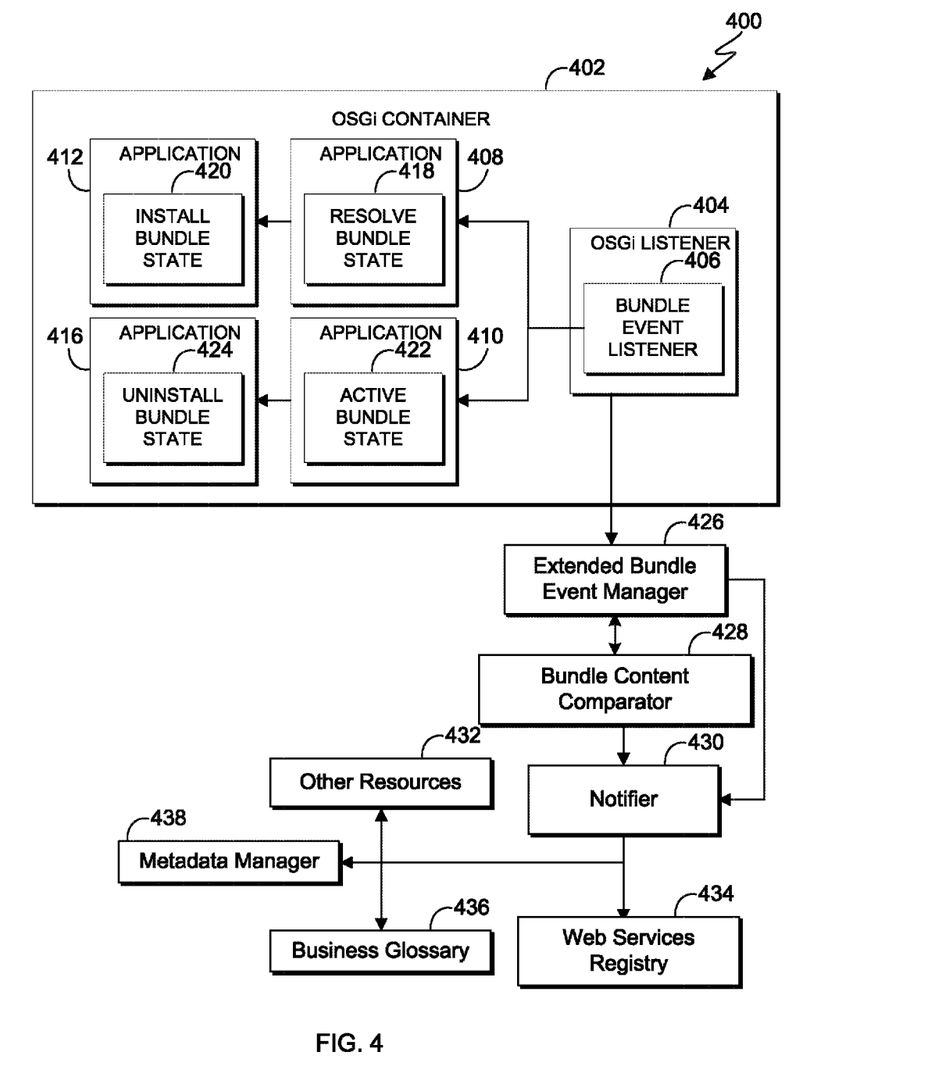
FIG. 4 is a block diagram of an example for identifying granular events, in accordance with an embodiment of the present invention.

FIG. 4 is diagram 400 illustrating an example for identifying granular events. In one embodiment, diagram 400 includes OSGi container 402, extended bundle event manager 426, bundle content comparator 428, notifier 430, web services registry 434, business glossary 436, and other resources 432. OSGi container 402 contains a plurality of applications (e.g., applications 408, 410, 412, and 416), their corresponding bundle states (e.g., resolve bundle state 418, active bundle state 422, uninstall bundle state 424, install bundle state 420), and OSGi listener 404 which contains bundle event listener 406.

In one embodiment, bundle event listener 406 monitors applications 408, 410, 412, and 416 for bundle events. For example, application 410 may undergo a bundle event and change the bundle state from active bundle state 422 to uninstall bundle state 424. In this instance, bundle event listener 406 detects the bundle event in application 410 and transmits bundle event information to extended bundle event manager 426 for subsequent processing.

Extended bundle event manager 426 uses bundle content comparator 428 and bundle event information to generate granular events based, at least in part, on discrepancies between metadata of bundles in application 410 prior to the bundle event (e.g., active bundle state 422) and metadata of bundles in application 410 subsequent to the bundle event (e.g., uninstall bundle state 424). As previously discussed, extended bundle event manager 426 may transmit the detected granular events to notifier 430. Subsequently, notifier 430 may generate notifications to one or more subscribers (e.g., web services registry 434, business glossary 436, metadata manager 438, and other resources 432). Accordingly, the one or more subscribers may leverage information pertaining to the granular events to help improve lifecycle management of application 408, 410, 412, and 416 in OSGi container 402.

Figure 5:
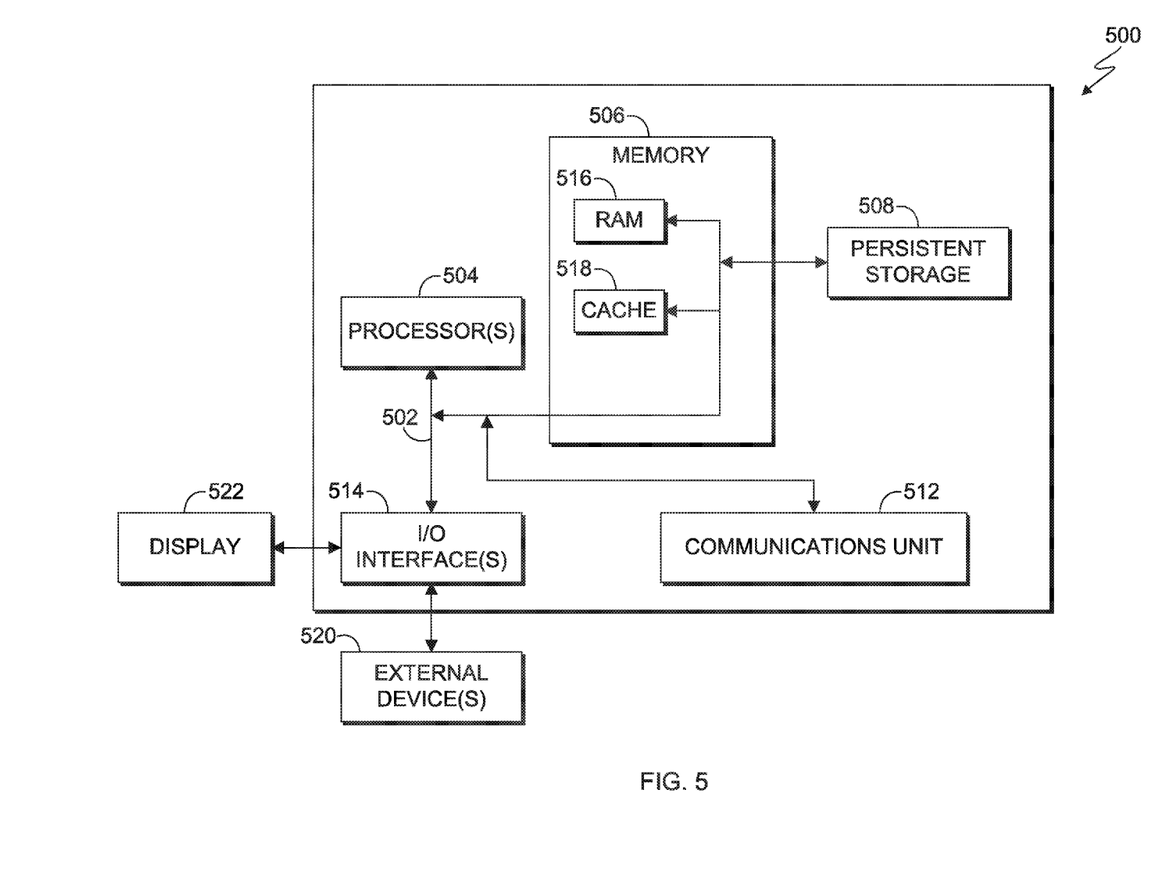
FIG. 5 is a block diagram of internal and external components of the computer systems of FIG. 1, in accordance with an embodiment of the present invention.

FIG. 5 is a block diagram of internal and external components of a computer system 500, which is representative the computer systems of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In one embodiment, memory 506 includes random access memory (RAM) 516 and cache memory 518. In general, memory 506 can include any suitable volatile or non-volatile computer-readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network (e.g., network 130). In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520 such as a keyboard, computer mouse, touch screen, virtual keyboard, touch pad, pointing device, or other human interface devices. External devices 520 can also include portable computer-readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
receiving, by one or more computer processors, first bundle information relating to the content of a bundle at a first time, wherein the bundle relates to one or more resources in an application of a distributed computing environment;
monitoring, by one or more computer processors, the bundle for a bundle event, wherein the bundle event is generated from a change in a lifecycle state of the bundle;
determining, by one or more computer processors, that the bundle event has occurred;

responsive to determining that the bundle event has occurred, receiving, by one or more computer processors, second bundle information relating to the content of the bundle at a second time; and responsive to receiving the second bundle information, identifying, by one or more computer processors, a granular event associated with the bundle event, wherein the granular event relates to a difference between the first bundle information and the second bundle information.

2. The method of claim 1, wherein identifying the granular event associated with the bundle event comprises:

comparing, by one or more computer processors, the first bundle information relating to the content of the bundle at the first time and the second bundle information relating to the content of the bundle at the second time.

3. The method of claim 2, wherein the first bundle information includes a first set of metadata pertaining to the bundle and the second bundle information includes a second set of metadata pertaining to the bundle.

4. The method of claim 1, further comprising:

processing, by one or more computer processors, the identified granular event to create a notification; and notifying, by one or more computer processors, a subscriber with the created notification.

5. The method of claim 1, wherein the bundle is implemented in a Java environment.

6. The method of claim 5, wherein:

the bundle is further implemented in an Open Service Gateway initiative (OSGi) for the Java environment; and the bundle includes at least one of the following: a dynamically loadable Java class file, and a configuration file declaring external dependencies.

7. The method of claim 1, wherein identifying the granular event associated with the bundle event comprises:

managing, by one or more computer processors, changes in lifecycle states of the bundle, using the granular event associated with the bundle event and the bundle event; and managing, by one or more computer processors, applications of the distributed computing environment, using the granular event associated with the bundle event, the bundle event, and subscribers for the bundle event.

\* \* \* \* \*